No. 661,814. Patented Nov. 13, 1900.
A. F. PETERSON.
PULVERIZER.
(Application filed Feb. 13, 1900.)
(No Model.) 2 Sheets—Sheet 1.
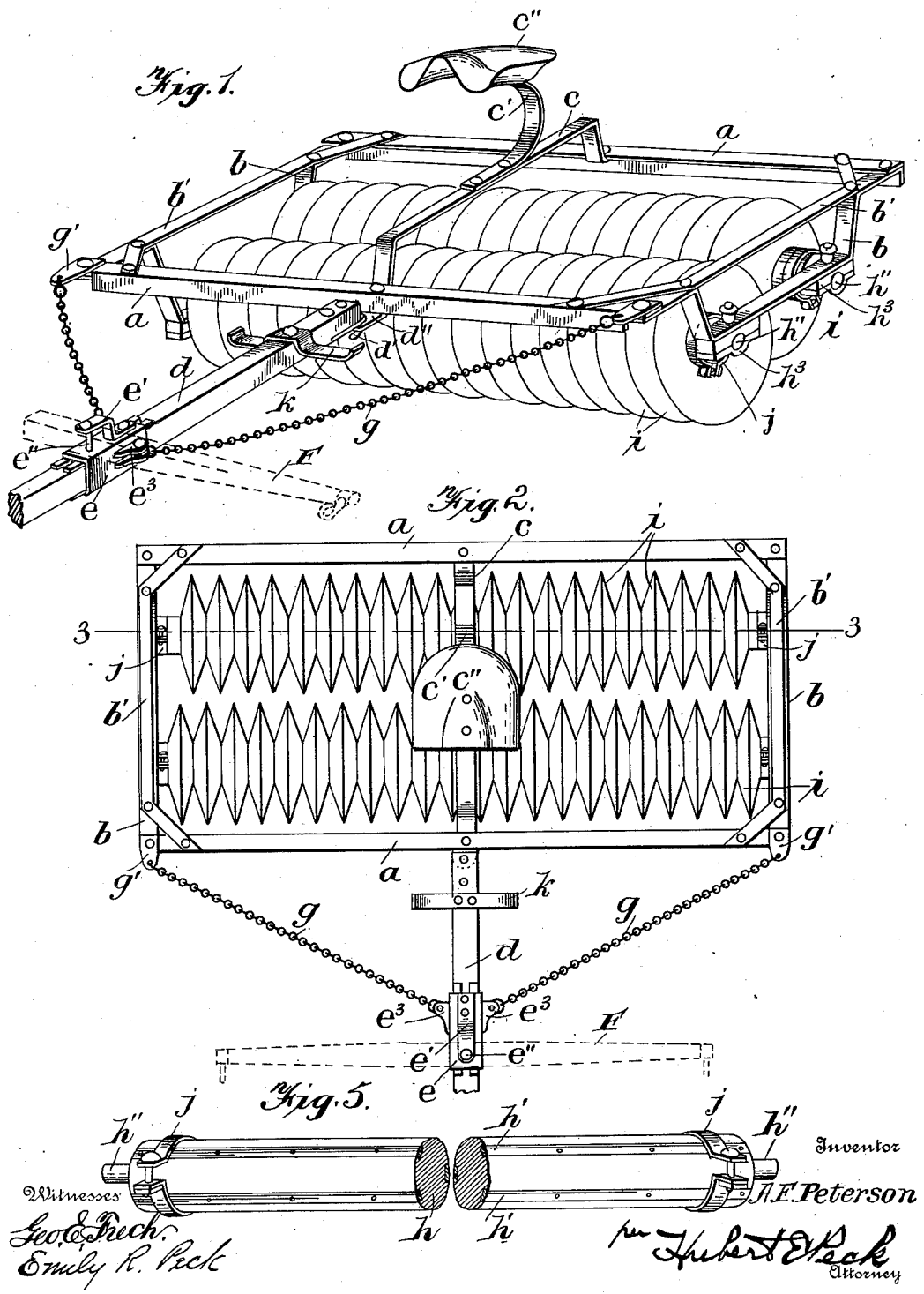

No. 661,814. Patented Nov. 13, 1900.
A. F. PETERSON.
PULVERIZER.
(Application filed Feb. 13, 1900.)
(No Model.) 2 Sheets—Sheet 2.
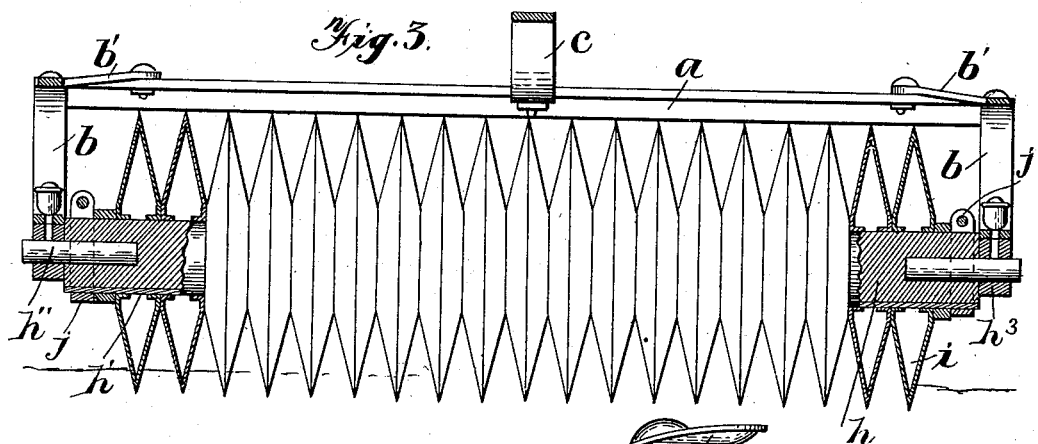
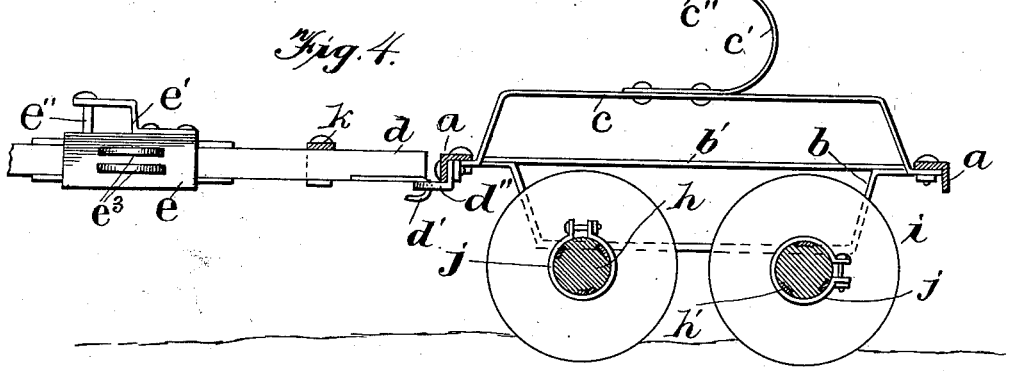
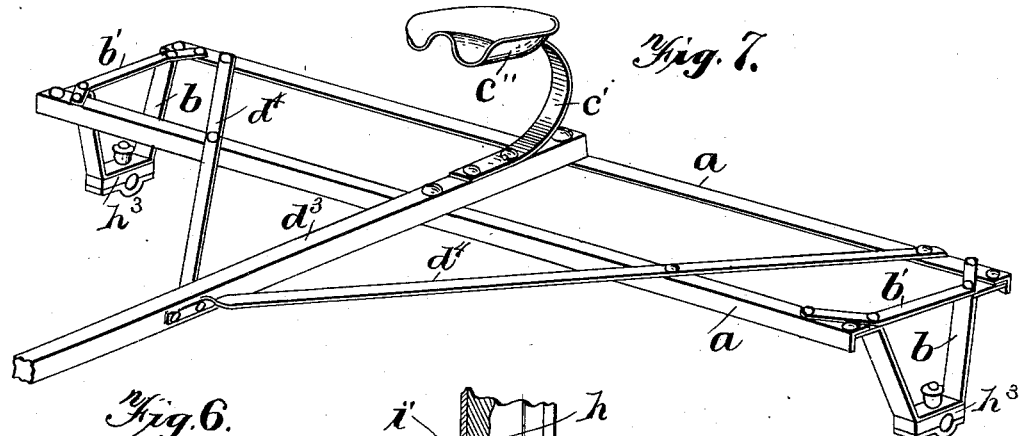
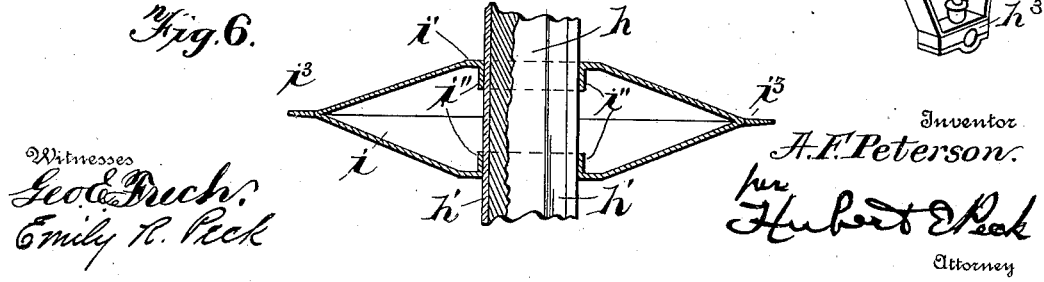
Witnesses
Geo. E. Truck.
Emily R. Peck.
Inventor
A. F. Peterson.
per Hubert E. Peck
Attorney

UNITED STATES PATENT OFFICE.

AUGUST F. PETERSON, OF KENT, OHIO.

PULVERIZER.

SPECIFICATION forming part of Letters Patent No. 661,814, dated November 13, 1900.

Application filed February 13, 1900. Serial No. 5,092. (No model.)

*To all whom it may concern:*

Be it known that I, AUGUST F. PETERSON, a citizen of the United States, residing at Kent, in the county of Portage and State of Ohio, have invented certain new and useful Improvements in Pulverizers; and I do hereby declare the following to be a full, clear, and exact description of the invention, such as will enable others skilled in the art to which it appertains to make and use the same.

This invention relates to certain improvements in agricultural implements, and more particularly to improvements in pulverizers for harrowing and loosening the soil for planting; and the object and nature of my invention will be obvious to those skilled in the art from the following description of the accompanying drawings, which, however, only illustrate examples for the purposes of explanation from among other constructions within the spirit and scope of my invention.

My invention consists in certain novel features of construction and in combinations and arrangements of parts and details, as more fully and particularly pointed out and specified hereinafter.

Referring to the accompanying drawings, Figure 1 is a perspective of an implement constructed in accordance with my invention, the draft tongue or pole being broken away and the doubletree shown by dotted lines. Fig. 2 is a plan view of the implement. Fig. 3 is a partial sectional view taken on the line 3 3, Fig. 2. Fig. 4 is partial longitudinal sectional view of the machine. Fig. 5 is a detail broken perspective of one of the wooden shafts or rollers detached from the machine and journal-boxes, showing the metal facing-plates, the end clamping-rings and the end journals, the cutting-disks being removed from the shaft. Fig. 6 is a detail sectional view, enlarged, through a cutting-disk, showing part of the shaft broken away. Fig. 7 is a perspective view of a framework for a single-shaft implement within the spirit and scope of my invention.

In the drawings, $a$ $a$ are the upper parallel cross frame-bars, and $b$ $b$ the centrally-depressed end yokes, connections, or bars rigidly connecting the long cross-bars $a$ $a$ and all constituting the generally rectangular or preferably oblong frame of the machine. The long front and rear cross-bars $a$ $a$ are preferably (although not necessarily) constructed of angle-iron bars arranged with the top horizontal flange or web and the vertical depending flange or web. The frame ends are formed by strong, usually flat, metal bars at their ends rigidly bolted or otherwise secured to the ends of said front and rear cross-bars. These end bars or pieces are centrally depressed—that is, each end piece has the horizontal depressed straight intermediate portion about in the horizontal plane of the axis of the several series of cutting-disks, with the upwardly-inclined ends having the straight horizontal extremities fitting and secured to the ends of the cross-bars, as previously described. The frame ends are trussed or braced by the metal straps, plates, or bars $b'$ $b'$, arranged approximately in the same horizontal plane as the long cross-bars $a$ $a$, and said straps span the spaces between the upper ends of said frames or yokes $b$ $b$ and are arranged approximately in the same vertical planes with said ends, respectively. Each brace or truss strap is preferably secured to the upper ends of its bar $b$ and has its ends deflected and secured to the front and rear cross-bars, respectively, about as shown, thereby bracing and strengthening the corners of the frame of the machine as well as bracing or trussing the depressed end bars. A frame of great strength is thus provided for the machine, although the frame is exeedingly light and durable.

$c$ is an arched seat-support consisting of a metal bar arranged centrally of the machine or implement and having the downwardly-inclined ends rigidly secured to the front and rear cross-bars, so that the straight intermediate portion of the bar is elevated the desired distance above the plane of the cross-bars $a$ $a$ of the frame.

$c'$ is the seat-spring, secured on the bar or support $c$ and carrying the driver's seat $c''$. This bar or seat-support forms an additional brace for the machine-frame and increases the stiffness and strength thereof, although my invention is not limited to the employment of such bar or support $c$ nor to any particular arrangement of seat-support nor, in fact, to the employment of a rider's seat, although when it is desired to employ such advantages are attained by the construction just described.

$d$ is the pole or tongue to which the draft-animals are attached. This is usually composed of a rigid stick or bar and extends forwardly from the center of the front cross-bar and at its rear end is suitably coupled to said cross-bar preferably in the line or vertical plane of said seat-support or bar $c$. The tongue can be attached in any suitable manner, as by a rigid hook or projection $d'$, rigid with and depending from the end of the tongue and passing through an opening in a rigid projection $d''$, extending forwardly from said frame-bar and on which the rear end of the tongue rests. If desired, the front end of the seat-support $c$, which forms a connecting-bar, can be extended around under the front bar $a$ and forwardly to form the rest $d''$, just mentioned, for the rear end of the tongue. However, I do not wish to limit my invention to such an arrangement, although I consider it a valuable feature for certain purposes.

I have found it advantageous to utilize the tongue for guiding or directing the machine and to provide mechanism for applying or attaching the draft to the machine other than through the coupling between the rear end of the tongue and the main frame. As an example of what might be employed for this purpose within the spirit and scope of my invention I show a slide movable longitudinally of the tongue and to which the draft is attached and through the medium of which the draft is applied to the implement-frame independently of the attachment of the tongue to said frame. In the drawings the slide is composed of a metal box or casing $e$, loosely surrounding the tongue and slidable longitudinally thereon. If desirable, the box can slide on metal facings or wear-plates secured to the tongue. The doubletree F is pivotally joined to this box $e$ in any suitable manner. For instance, I show the rigid brace $e'$, projecting above the top face of the box, to extend above the doubletree, which rests thereunder on the top face of the box and swings on the removable pivot bolt or pin $e''$, passing through the brace and doubletree into the box. The two side faces of the box are shown formed with perforated ears or lugs $e^3$, by means of which suitable draft connections, such as chains $g\ g$, are detachably coupled at their front ends to said box. The chains can be coupled to said box by pins or bolts passing vertically through each pair of lugs or ears $e^3$ and through a chain-link inserted between said ears. The said draft connections $g\ g$ preferably extend rearwardly from opposite sides of the box to the outer front corners of the main frame, respectively. The front corners of the main frame are preferably provided with forwardly-projecting perforated ears $g'\ g'$, to which said chains can be coupled in any suitable manner, as by hooks, substantially as shown.

From the foregoing description it is obvious that the lengths of the chains between the slidable box and the frame of the implement can be varied or adjusted. I also want it understood that I do not limit the features of my invention relating to the application of the draft to the exact constructions and arrangements either shown or hereinbefore specified. By employing such arrangement for the application of the draft the doubletree can move back and forth on the pole with the slide, and as the draft is not on the pole and through the same to the implement the implement is prevented from wabbling or shifting from side to side, but moves straight ahead with the draft-animals.

The pulverizing or harrowing element of the implement is made up of a series of beveled disks having circular edge-cutting blades. The disks are loosely mounted closely together on one or more preferably wooden shafts or rollers having end journals mounted in journal-boxes on the frame ends. In the preferred form I employ two parallel series of cutting-disks arranged one in advance of the other, with the disks of one arranged opposite the spaces between the cutting-blades of the other series, so that said disks do not "track."

$h$ is one of the rollers or shafts which is preferably composed of wood longitudinally faced with several preferably equally-spaced metal plates or bars $h'$, set or countersunk longitudinally into the circumference thereof, so that the disks, as hereinafter set up and rotating on or with said shafts will not unduly wear or cut grooves in the wood under certain conditions. The said plates form wearing-surfaces and maintain the proper even surface or circumference of the wooden shaft and prevent binding of the disks on the shaft by reason of swelling of the wood. The ends of each shaft are formed with the reduced journals $h''$, the large portion of each shaft being in length usually equal to the distance between the depressed end pieces of the main frame. The end journals of the shafts are usually located under the depressed ends of the frame and are mounted in separable journal-boxes $h^3$, secured to and preferably depending from the under sides of said frame ends. Oil-passages can be formed down through the frame ends into said boxes to supply a suitable lubricant to the journals, and oil-cups can be mounted, as shown, at the upper faces of said frame ends. The end journals $h''$ of the wooden shafts or rollers can be formed by metal rods or pins driven or otherwise secured concentrically in the ends thereof, so as to project the desired distance beyond the ends of the wooden shafts.

Each cutting-disk $i$ is preferably (although not necessarily) formed integral of suitable metal and in any suitable manner. The disks are hollow, and the side walls of the same are comparatively thin. The side or end faces of each disk are beveled or taper or converge together from the hub toward the outer circumference or edge. Both ends of each disk are formed with the parallel flat faces $i'$ $i'$ around the hub, so that when the disks are closely arranged on the shaft they will abut or engage at said flat faces, and thus aid in preventing access of dust and soil to the bearings of the disks on the shaft. The circular openings through said flat ends or faces $i'$ $i'$ of each disk receiving the shaft are surrounded by enlarged bearing edges $i''$ $i''$, formed by inwardly-projecting annular flanges. These wide edges form the bearing-surfaces of the disk on the shaft and reduce wear, prevent cutting of either one of the edges of a disk into the shaft, and hold the disks to rotate accurately in planes at right angles to the axis of the shaft. Each disk is provided with a projecting circular cutting-blade $i^3$, arranged circumferentially around its edge and rigid with the disk. This blade is arranged in the plane of the center of the disk and projects beyond the meeting circle of the two tapered or conical end walls of the disk.

Material advantages in practical operation and results are attained by providing the beveled disks with the projecting circular cutting-blades. The blades easily cut through the lumps and clods of earth or sod and through trash and sink deeply into the soil, and yet without applying such pressure on the upper surface of the soil as to pack the same and form a crust through which the growing plants break with difficulty. The soil is so cut and loosened by these blades in connection with the oppositely-beveled sides of the disks as to hold the moisture where the plants root, and yet the soil is left loose and pulverized at the surface for the free upward passage of the plant. These disks are arranged closely together on their respective shafts and between the ends of the frame of the implement. Each disk is free to turn independently of the remaining disks and of the shaft. Hence in turning the implement the shafts remain stationary and the disks on one portion of a shaft revolve forwardly and those on the opposite portion backwardly, and the disks can turn at different rates of speed. When the implement is moving straight ahead and under ordinary operating conditions, the disks and their respective shafts rotate together as though the disks were rigid on the shafts.

Suitable means are provided to maintain the disks on the shafts and yet permit easy removal for repair and also to permit adjustment of the disks longitudinally of a shaft and toward and from each other. The shafts can be easily removed from their journal-boxes, and by providing such means as just mentioned the disks can be removed from or replaced on a shaft and the number of disks reduced or increased within the capacity of the shaft. For instance, I show metal clamps on the ends of each wooden shaft between the frame ends and the end disks on the shaft. As shown, each clamp consists of an open or split metal ring, sleeve, or band $j$, having radially-projecting perforated ears or lugs connected by bolts, so that each expansible ring can be increased or diminished in diameter to grip the shaft with less or greater force, and the rings can be moved longitudinally of the shaft to adjust the disks or can be removed from the end of the shaft to permit removal of the disks. These clamps also can be utilized to hold the metal strips or facings in their grooves or seats in the wooden shaft or roller, and if the shaft should shrink or warp by reason of exposure to dampness and dry heat the clamps can be easily tightened to hold the said strips in place and the disks in their proper relative positions.

$k$ is a metal cross-piece secured on the rear portion of the tongue and projecting beyond the side faces thereof to form foot-rests for the driver occupying the seat before described. As the rear shaft usually has one wheel less than the front shaft, I can interpose spacing-rings on the rear shaft between the end disks and split clamps $j$. This machine not only performs the functions of a pulverizer, but also that of a roller, as it will pulverize the hardest clods and lumps and also so press down the earth as to form a solid seed-bed, where the plants root, and yet leave the soil loose at the surface for the free upward passage of the plant-shoots. This machine pulverizes, harrows, and rolls in the one operation.

I do not wish to limit my invention to an implement embodying all features hereinbefore set forth, and my invention involves the employment of one or more series of disks. For instance, in Fig. 7 I show the framework for an implement provided with a single shaft and series of cutting-disks. I also show the tongue $d^3$ crossing and resting on and secured to the front and rear frame-bars and carrying the seat-spring $c'$ and seat $c''$. Also instead of the chains $g$, attached to a slide, I can secure rearwardly-extending connections $d^4$ $d^4$ rigidly to the tongue and diverge the same rearwardly and secure them rigidly to the front and rear frame-bars.

It is evident that various changes might be made and modifications resorted to in the forms, constructions, and arrangements of the parts described without departing from the spirit and scope of my invention. Hence I do not wish to limit myself to the exact construction shown.

Having thus fully described my invention, what I claim as new, and desire to secure by Letters Patent of the United States, is—

1. In a pulverizer, the combination of a frame, a rotary wooden shaft having metal pins secured to its ends forming projecting journals mounted to rotate in the frame, metal facing-strips arranged longitudinally on the exterior of the shaft, the rotary hollow beveled cutting-disks loosely arranged on the shaft and having the flat abutting ends, and the inner flanged edges bearing on the shaft, and the adjustable clamps on the ends of the shaft, substantially as described.

2. In a pulverizer, the combination of a frame, a rotary shaft mounted therein, the closely-arranged hollow metal disks independently rotatable on said shaft and rotatable together with said shaft, and removable means confining the disks on the shaft, each disk composed of the two end walls rigid with each other and having the central openings and flat faces around said openings, said walls converging to an annular junction and the surrounding cutting-blade rigid with both walls and projecting beyond said junction, substantially as described.

3. In a pulverizer, the hollow rotary metal cutting and soil-pressing disk having the side faces beveled oppositely to an annular junction and the circular cutting-blade rigid with the disk and projecting beyond said annular junction between the rigid side faces, as described.

4. In a pulverizer, the combination of a frame, a rotary shaft, the series of closely-arranged hollow metal disks rotatable independently on said shaft and together with the shaft, means holding the disks together on the shaft, each disk having the side walls widely separated at the center and having the flanged openings and narrow flat faces, the walls converging oppositely from said flat faces and rigidly united at the edge of the disk, and the circular cutting-blade rigid with both walls and projecting beyond the meeting line thereof, substantially as described.

5. In a pulverizer, the combination of a frame, a rotary wooden shaft removably mounted thereto, the metal facing-strips arranged longitudinally of and secured to the shaft, the hollow metal disks rotatable independently on the shaft and also rotatable together with the shaft, said disks loosely abutting against each other and having the oppositely-beveled end faces, and the removable split-ring clamps surrounding the ends of the shaft and the facing-strips, and permitting removal and adjustment of the disks, substantially as described.

6. In a pulverizer, the combination of a frame, a shaft, and a series of metal disks arranged on the shaft, each disk formed hollow with widely-separated central hubs receiving said shaft and having its end walls converging from said hubs to a meeting line at the periphery of the disk, and the circular cutting-blade $i^3$, rigid with the disk and surrounding and projecting beyond said meeting line of the end walls, for the purposes described.

7. A pulverizer comprising the frame, the rotary wooden shaft having projecting end spindles mounted to the frame, and metal facing-strips arranged longitudinally on and secured at intervals to said shaft, the metal disks arranged end to end and independently rotatable on the shaft, each disk having the converging end walls and the circular cutting-blade surrounding and projecting beyond the meeting line of said walls, and clamps on the ends of the shaft and confining the disks in place, substantially as described.

In testimony whereof I affix my signature in presence of two witnesses.

AUGUST F. PETERSON.

Witnesses:
W. H. MELAY,
C. M. DAVIS.